United States Patent
Kennedy

(10) Patent No.: US 8,220,055 B1
(45) Date of Patent: Jul. 10, 2012

(54) BEHAVIOR BLOCKING UTILIZING POSITIVE BEHAVIOR SYSTEM AND METHOD

(75) Inventor: Mark K. Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 2814 days.

(21) Appl. No.: 10/774,177

(22) Filed: Feb. 6, 2004

(51) Int. Cl.
*H04L 29/06* (2006.01)
(52) U.S. Cl. .......................................... 726/25; 726/22
(58) Field of Classification Search .............. 726/22–25
See application file for complete search history.

(56) References Cited

U.S. PATENT DOCUMENTS

| | | | |
|---|---|---|---|
| 7,076,803 B2 * | 7/2006 | Bruton et al. .................. 726/23 |
| 7,191,252 B2 * | 3/2007 | Redlich et al. ................ 709/246 |
| 2002/0099959 A1 * | 7/2002 | Redlich et al. ................ 713/201 |
| 2003/0061514 A1 * | 3/2003 | Bardsley et al. .............. 713/201 |
| 2004/0083372 A1 * | 4/2004 | Williamson et al. .......... 713/188 |
| 2004/0117648 A1 * | 6/2004 | Kissel ........................... 713/200 |

FOREIGN PATENT DOCUMENTS

EP 1202228 A1 * 5/2002
GB 2367714 A * 4/2002

* cited by examiner

*Primary Examiner* — Kim Vu
*Assistant Examiner* — Randal Moran
(74) *Attorney, Agent, or Firm* — McKay and Hodgson, LLP; Serge J. Hodgson; Sean P. Lewis

(57) ABSTRACT

A method includes decreasing a suspicion of a negative action by an application if the application has previously performed a positive action. The positive action is an action that is never or rarely taken by malicious code. In one example, the positive action is use of a user interface element by the application to have a user interaction with a user of the computer system. By taking into consideration the positive action by the application, the occurrence of false positives is minimized.

21 Claims, 2 Drawing Sheets

BEHAVIOR BLOCKING UTILIZING POSITIVE BEHAVIOR SYSTEM AND METHOD

BACKGROUND OF THE INVENTION

1. Field of the Invention

The present invention relates to the protection of computer systems. More particularly, the present invention relates to a behavior blocking system.

2. Description of the Related Art

In the computer security domain, there were behavior blocking applications that would block a suspicious action by an application on a computer system. However, a large set of these blocked suspicious actions are not malicious, i.e., are false positives.

Typically, the user of the computer system is notified that the suspicious action has been blocked and the user is required to select how the blocked suspicious action should be handled, e.g., blocked, released, blocked in the future or released in the future. Thus, these false positives are intrusive and annoying to the user of the computer system at a minimum and result in lost productivity due to the time spent by the user in responding to the false positives.

SUMMARY OF THE INVENTION

A method includes decreasing a suspicion of a negative action by an application if the application has previously performed a positive action. The positive action is an action that is never or rarely taken by malicious code. In one embodiment, the positive action is use of a user interface element by the application to have a user interaction with a user of a computer system. By taking into consideration the positive action by the application, the occurrence of false positives is minimized.

Embodiments in accordance with the present invention are best understood by reference to the following detailed description when read in conjunction with the accompanying drawings.

DETAILED DESCRIPTION

Figure 2:
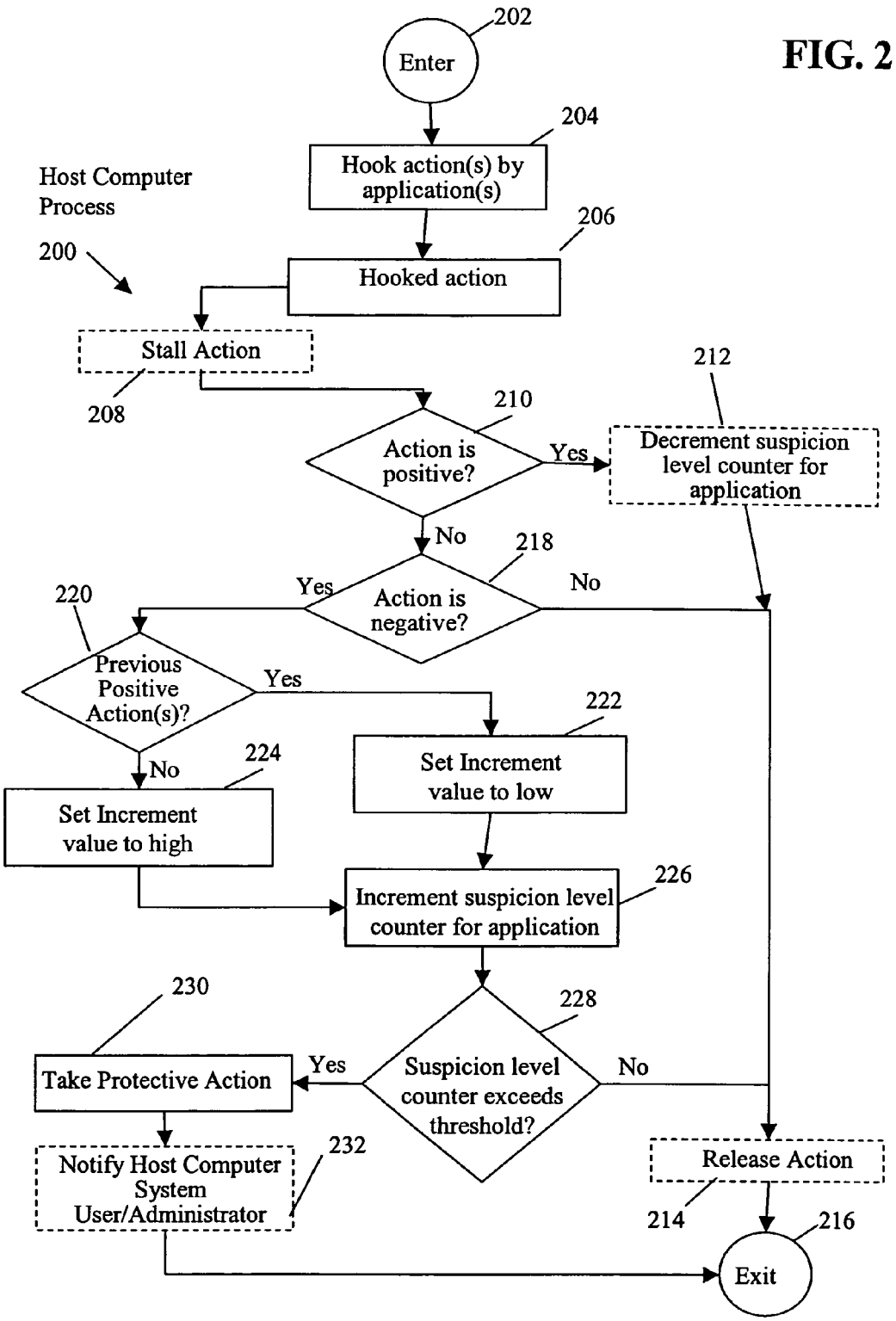
FIG. 2 is a flow diagram of a host computer process in accordance with one embodiment of the present invention. Common reference numerals are used throughout the drawings and detailed description to indicate like elements.

In accordance with one embodiment, referring to FIG. 2, a method includes determining that an action by an application is negative (check operation 218). Upon a determination that the action is negative, the method includes determining if the application has had at least one positive action prior to the negative action (check operation 220). A suspicion level counter for the application is incremented more (operations 224, 226) or less (operations 222, 226) depending upon whether the application has had at least one positive action prior to the negative action. By taking into consideration the positive action by the application, the occurrence of false positives is minimized.

Figure 1:
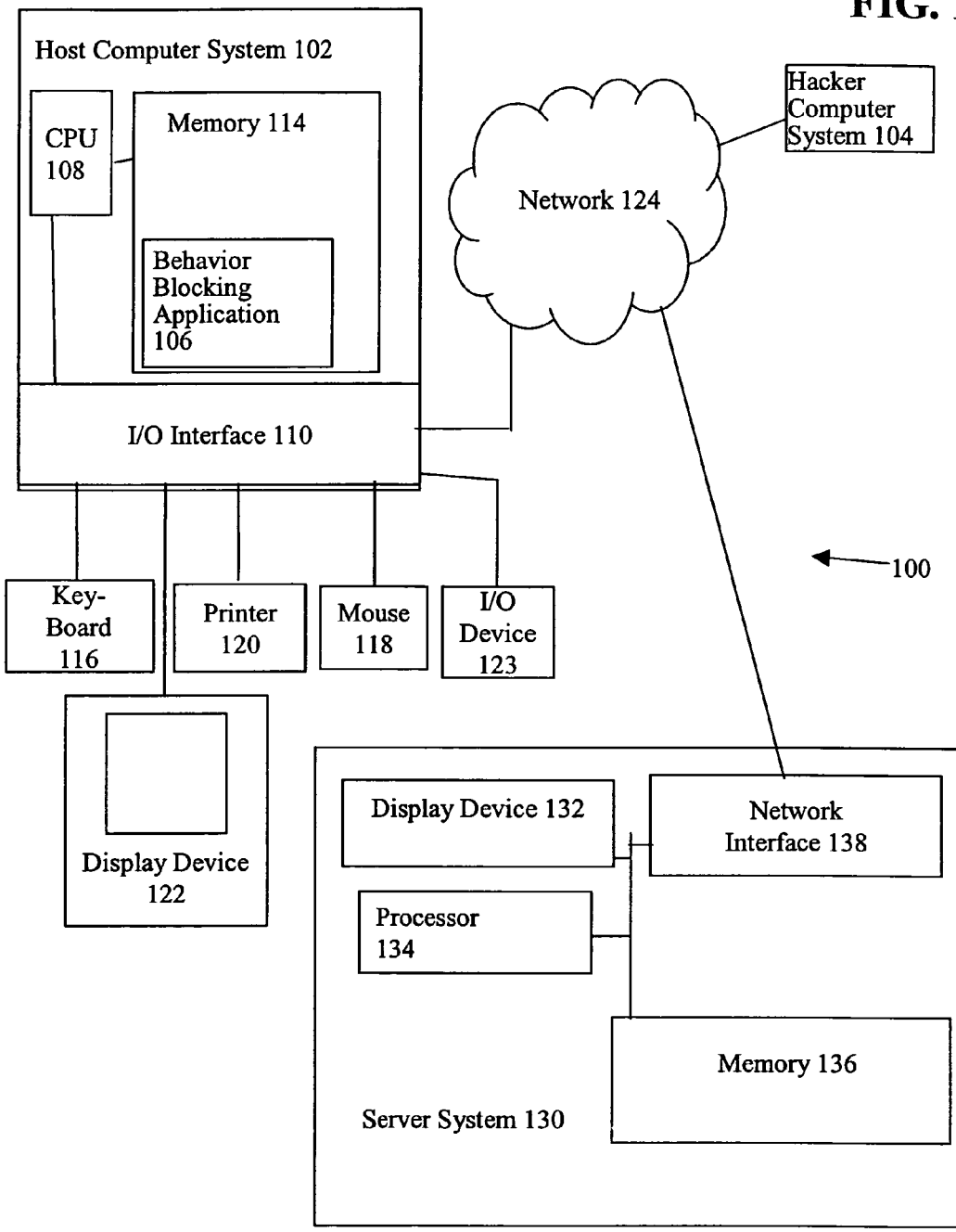
FIG. 1 is a diagram of a client-server system that includes a behavior blocking application executing on a host computer system in accordance with one embodiment of the present invention.

More particularly, FIG. 1 is a diagram of a client-server system 100 that includes a behavior blocking application 106 executing on a host computer system 102, e.g., a first computer system, in accordance with one embodiment of the present invention.

Host computer system 102, sometimes called a client or user device, typically includes a central processing unit (CPU) 108, hereinafter processor 108, an input output (I/O) interface 110, and a memory 114.

Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, behavior blocking application 106 is loaded into host computer system 102 via I/O device 123, such as from a CD, DVD or floppy disk containing behavior blocking application 106.

Host computer system 102 is coupled to a server system 130 of client-server system 100 by a network 124. Server system 130 typically includes a display device 132, a processor 134, a memory 136, and a network interface 138.

Further, host computer system 102 is also coupled to a hacker computer system 104 of client-server system 100 by network 124. In one embodiment, hacker computer system 104 is similar to host computer system 102, for example, includes a central processing unit, an input output (I/O) interface, and a memory. Hacker computer system 104 may further include standard devices like a keyboard, a mouse, a printer, a display device and an I/O device(s). The various hardware components of hacker computer system 104 are not illustrated to avoid detracting from the principles of the invention.

Network 124 can be any network or network system that is of interest to a user. In various embodiments, network interface 138 and I/O interface 110 include analog modems, digital modems, or a network interface card.

Behavior blocking application 106 is stored in memory 114 of host computer system 102 and executed on host computer system 102. The particular type of and configuration of host computer system 102, hacker computer system 104, and server system 130 are not essential to this embodiment of the present invention.

FIG. 2 is a flow diagram of a host computer process 200 in accordance with one embodiment of the present invention. Referring now to FIGS. 1 and 2 together, execution of behavior blocking application 106 by processor 108 results in the operations of host computer process 200 as described below in one embodiment.

From an enter operation 202, flow moves to a hook action (s) by application(s) operation 204. In hook action(s) by application(s) operation 204, one or more applications executed on host computer system 102 are hooked. Generally, an application is hooked by hooking and intercepting specific action(s), sometimes called hooked action(s), of the application.

More particularly, in hook action(s) by application(s) operation 204, one or more actions of one or more applications are hooked. To illustrate, a file system filter driver in the Windows operating system hooks file events by installing a layer between the user and file system for the file events and intercepts the file events between the user and file system.

In accordance with one embodiment, an application is hooked by installing one or more user mode hooks to intercept actions by the application that are interactions with the user. These actions by the application that are interactions with the user are thus hooked actions. Hooking of applications and actions is well known to those of skill in the art and typically depends upon the particular operating system of host computer system 102. The particular hooking technique used is not essential to the present invention.

From hook action(s) by application(s) operation 204, flow moves to a hooked action operation 206. In hooked action operation 206, a hooked action, i.e., an action hooked in hook action(s) by application(s) operation 204, is made by a hooked application. The hooked action is sometimes herein referred to as "the action" or "the action by the hooked application" for simplicity of discussion.

From hooked action operation 206, flow moves, optionally, to a stall action operation 208 (or directly to an action is positive check operation 210 if stall action operation 208 is not performed).

In stall action operation 208, the action by the hooked application is stalled, i.e., is prevented from being executed or otherwise implemented. From stall action operation 208, flow moves to action is positive check operation 210.

In action is positive check operation 210, a determination is made as to whether the action by the hooked application is positive, i.e., is a positive action. Generally, a positive action is an action that is rarely or never performed by malicious code. In one embodiment, malicious code is defined as any computer program, module, set of modules, or code that enters a computer system without an authorized user's knowledge and/or without an authorized user's consent.

For example, malicious code rarely if ever interacts with the user, e.g., a human, of host computer system 102. As an illustration, malicious code has no user interaction about 95% of the time and about 5% of the time uses a message box to have a very minimal user interaction. Accordingly, in one embodiment, a positive action by an application occurs when the application interacts with the user of host computer system 102, i.e., has a user interaction. Because use of a message box is a very minimal user interaction, in one embodiment, use of a message box is not defined as a positive action although use of a message box can be a positive action if desired to be defined as such.

For example, a positive action by an application occurs when the application uses a user interface element to have a user interaction with the user.

Examples of user interactions include interactions with the user in setting up the application or using the application. For example, a user interaction occurs when the application is configured by the user. As another example, a user interaction occurs when the user selects the recipient(s) of an e-mail message or the information, e.g., attachments, to be sent with an e-mail message. Although specific examples of user interactions are provided, in light of this disclosure, it is understood that other user interactions with an application can occur, and the particular user interactions depend, for example, on the particular application.

Generally, a user interface element is an element used by a user in providing input or otherwise interacting with an application. Examples of user interface elements include: (1) check boxes; (2) radio boxes; (3) list boxes; (4) combo boxes; (5) text boxes; (6) common dialog boxes; and (7) message boxes. Although specific examples of user interface elements are provided, in light of this disclosure, it is understood that other user interface elements can be used by the user, and the particular user interface element depends, for example, on the particular application.

If a determination is made that the action by the hooked application is a positive action in action is positive check operation 210, flow moves, optionally, to a decrement suspicion level counter for application operation 212 (or directly to an optional release action operation 214 if operation 212 is not performed or directly to an exit operation 216 if operations 212 and 214 are not performed).

In one embodiment, each application has an associated suspicion level counter, which is a measure of the suspicion associated with the application. This suspicion level counter is decremented in decrement suspicion level counter for application operation 212 thus reducing the suspicion associate with the application.

Decrement suspicion level counter for application operation 212 is optional and in one embodiment is not performed. In accordance with this embodiment, the suspicion level counter associate with the application is not decremented and the suspicion associated with the application remains unchanged.

From decrement suspicion level counter for application operation 212, flow moves to, optionally, release action operation 214. As discussed above, stall action operation 208 is optional. Accordingly, if stall action operation 208 is performed and the action was stalled, release action operation 214 is performed to release the action.

Conversely, if stall action operation 208 was not performed, release action operation 214 is unnecessary and thus not performed.

From release action operation 214 (or directly from decrement suspicion level counter for application operation 212 if operation 214 is not performed), flow moves to and exits at exit operation 216 or returns to hooked action operation 206.

Returning again to action is positive check operation 210, if a determination is made that the action is not a positive action, flow moves to an action is negative check operation 218.

In action is negative check operation 218, a determination is made as to whether the action by the hooked application is negative, i.e., is a negative action. Generally, a negative action is an action that is highly suspicious or suggestive of malicious code.

Examples of negative actions include: (1) attacking security software; (2) sending of executable attachments; (3) copying of an application across a network; and (4) sending executable instant messengering attachments. Although specific examples of negative actions are provided, in light of this disclosure, it is understood that other negative actions can occur, and the particular negative actions depend, for example, on the particular application.

If a determination is made that the action by the hooked application is not a negative action in action is negative check operation 218, flow moves to optional release action operation 214 (or directly to exit operation 216 if operation 214 is not performed).

Conversely, if a determination is made that the action by the hooked application is a negative action in action is negative check operation 218, flow moves to a previous positive action(s) check operation 220. In previous positive action(s) check operation 220, a determination is made as to whether the hooked application has performed any positive actions prior to the present negative action.

If a determination is made that the hooked application has performed at least one positive action prior to the present negative action, flow moves to a set increment value to low operation 222.

In set increment value to low operation 222, the increment value for the suspicion level counter for the application is set to low. Stated another way, in set increment value to low operation 222, the increment value for the suspicion level counter for the application is set to a first increment value, sometimes called a low increment value. From set increment value to low operation 222, flow moves to an increment suspicion level counter for application operation 226.

Conversely, if a determination is made that the hooked application has not performed at least one positive action prior to the present negative action, flow moves to a set increment value to high operation 224.

In set increment value to high operation 224, the increment value for the suspicion level counter for the application is set to high. Stated another way, in set increment value to high operation 224, the increment value for the suspicion level counter for the application is set to a second increment value, sometimes called a high increment value. Generally, the second or high increment value is greater than the first or low increment value. From set increment value to high operation 224, flow moves to increment suspicion level counter for application operation 226.

In increment suspicion level counter for application operation 226, the suspicion level counter for the application is increment by the set increment value.

More particularly, the suspicion level counter for the application is increment by the low increment value set in set increment value to low operation 222 if the hooked application has performed at least one positive action prior to the present negative action. Conversely, the suspicion level counter for the application is increment by the high increment value set in set increment value to high operation 224 if the hooked application has not performed at least one positive action prior to the present negative action.

Thus, the suspicion level associate with the application, i.e., the suspicion level counter, is increment more or less by the negative action depending upon whether the application has previous exhibited at least one positive action.

From increment suspicion level counter for application operation 226, flow moves to a suspicion level counter exceeds threshold check operation 228. In suspicion level counter exceeds threshold check operation 228, a determination is made as to whether the suspicion level counter exceeds the suspicion level threshold for the application. In one embodiment, the suspicion level threshold is a value which when exceeded by the suspicion level counter indicates with reliability that the application is malicious, i.e., contains malicious code.

If a determination is made that the suspicion level counter does not exceed the suspicion level threshold for the application in suspicion level counter exceeds threshold check operation 228, flow moves to release action operation 214 (or directly to exit operation 216 if operation 214 is not performed). In this event, the negative action by the application, and, more generally, the suspicion associated with the application, is not sufficient to conclude that the application is malicious.

Conversely, if a determination is made that the suspicion level counter does exceed the suspicion level threshold for the application in suspicion level counter exceeds threshold check operation 228, flow moves to a take protective action operation 230. In take protective action operation 230, protective action is taken to prevent the application from causing damage to or exploiting host computer system 102. For example, the action by the application is terminated. As discussed above, optionally, the action by the application was stalled in stall action operation 208. As another example of protective action, the application and/or a malicious thread running within the context of the application is terminated. Termination of applications is well known to those of skill in the art and so is not discussed further for clarity of discussion.

More particularly, because the suspicion level counter has exceeded the suspicion level threshold for the application, the likelihood that the application is malicious code is significant. However, by taking protective action, the application is prevented from exploiting and/or damaging host computer system 102.

In one embodiment, the user of host computer system 102 and/or administrator are given a set of choices on the protective action to be taken in take protective action operation 230 (or whether no protective action is to be taken).

To illustrate, take the case when operation 212 is not performed, the low increment value is 0.4, the high increment value is 0.6, and the suspicion level threshold is 0.5.

In accordance with this example, if the hooked application has not performed at least one positive action prior to the present negative action, the suspicion level counter will be incremented by and equal the high increment value of 0.6. Accordingly, a determination will made in check operation 228 that the suspicion level counter is 0.6, which is greater than the suspicion level threshold of 0.5, and protective action will be taken in take protective action 230.

However, continuing with this example, if the hooked application has performed at least one positive action prior to the present negative action, the suspicion level counter will be incremented by and equal the low increment value of 0.4. Accordingly, a determination will made in check operation 228 that the suspicion level counter is 0.4, which is less than the suspicion level threshold of 0.5, and the action will be released in release action operation 214.

As this example demonstrates, by taking into consideration whether or not the hooked application has performed at least one positive action prior to the present negative action, protective action is taken or not taken, respectively, thus minimizing the incidence of false positives.

To illustrate another example, take the case when the decrement value of operation 212 is 0.34, the low increment value is 0.34, the high increment value is 0.6, and the suspicion level threshold is 1.0.

In accordance with this example, if the hooked application has not performed at least one positive action and has performed two negative actions, the suspicion level counter will be equal to the high increment value of 0.6 multiplied by two, i.e., 1.2. Accordingly, a determination will made in check operation 228 that the suspicion level counter is 1.2, which is greater than the suspicion level threshold of 1.0, and protective action will be taken in take protective action 230.

However, continuing with this example, if the hooked application has performed at least one positive action, three subsequent negative actions are allowed before protective action is taken in take protective action 230. More particularly, the suspicion level counter will be −0.34, 0.00, 0.34, 0.68 after the positive action, first negative action, second negative action, and third negative action, respectively. Accordingly, if the application has previous exhibited at least one positive action, the suspicion associated with subsequent negative actions by the application is reduced thus minimizing the occurrence of false positives.

Flow moves from take protective action operation 230, optionally, to a notify host computer system user/administrator operation 232 (or directly to exit operation 216 if operation 232 is not performed). In notify host computer system user/administrator operation 232, the user of host computer system 102 and/or the administrator are notified that protective action has been taken on host computer system 102, e.g., that an action and/or an application have been terminated. The user and/or administrator can be notified using any one of a number of techniques, e.g., by using a pop up window, by writing to a file and/or otherwise by logging the event. Further, a notification or a sample of the malicious code can be provided to a security center.

From notify host computer system user/administrator operation 232, flow moves to and exits at exit operation 216 or returns to hooked action operation 206.

Referring again to FIG. 1, behavior blocking application 106 is in computer memory 114. As used herein, a computer memory refers to a volatile memory, a non-volatile memory, or a combination of the two.

Although behavior blocking application 106 is referred to as an application, this is illustrative only. Behavior blocking application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention may be carried out using any suitable hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, behavior blocking application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the behavior blocking functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the behavior blocking functionality in accordance with one embodiment of present invention can be implemented in a wide variety of computer system configurations. In addition, the behavior blocking functionality could be stored as different modules in memories of different devices. For example, behavior blocking application 106 could initially be stored in server system 130, and then as necessary, a portion of behavior blocking application 106 could be transferred to host computer system 102 and executed on host computer system 102. Consequently, part of the behavior blocking functionality would be executed on processor 134 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, behavior blocking application 106 is stored in memory 136 of server system 130. Behavior blocking application 106 is transferred over network 124 to memory 114 in host computer system 102. In this embodiment, network interface 138 and I/O interface 110 would include analog modems, digital modems, or a network interface card. If modems are used, network 124 includes a communications network, and behavior blocking application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
   decreasing a suspicion of a negative action by an application if said application has previously performed a positive action comprising setting an increment value of a suspicion level counter for said negative action to a first value, wherein said positive action is use of a user interface element by said application to have a user interaction with a user,
   wherein if a determination is made that said application has not had said previous positive action prior to said negative action, said method further comprising setting said increment value of said suspicion level counter for said negative action to a second value greater than said first value; and
   incrementing said suspicion level counter by said increment value.

2. The method of claim 1 wherein said positive action comprises interacting with said user of a computer system.

3. The method of claim 1 wherein said positive action is an action that is never performed by malicious code.

4. The method of claim 1 wherein said positive action is an action that is rarely performed by malicious code.

5. The method of claim 1 wherein said user interaction comprises an interaction with said user in setting up said application.

6. The method of claim 1 wherein said user interaction comprises an interaction with said user in using said application.

7. The method of claim 1 wherein said user interaction comprises said user selecting recipient(s) of an e-mail message.

8. The method of claim 1 wherein said user interaction comprises said user selecting information to be sent with an e-mail message.

9. The method of claim 1 wherein said user interface element is an element used by said user in interacting with said application.

10. The method of claim 1 wherein said user interface element is selected from the group consisting of a check box, a radio box, a list box, a combo box, a text box, a dialog box, and a message box.

11. The method of claim 1 wherein said negative action is suggestive of malicious code.

12. The method of claim 1 wherein said negative action is selected from the group consisting of an attack on security software, sending of an executable attachment, copying of said application across a network, and sending of an executable attachment as an instant message.

13. A method comprising:
determining that an action by an application is a negative action;
determining if said application has had a previous positive action prior to said negative action, wherein said positive action is use of a user interface element by said application to have a user interaction with a user,
wherein if a determination is made that said application has had said previous positive action prior to said negative action, said method further comprising setting an increment value of a suspicion level counter for said negative action to a first value,
wherein if a determination is made that said application has not had said previous positive action prior to said negative action, said method further comprising setting said increment value of said suspicion level counter for said negative action to a second value, wherein said first value is less than said second value; and
incrementing said suspicion level counter by said increment value.

14. The method of claim 13 further comprising determining if said suspicion level counter exceeds a suspicion level threshold.

15. The method of claim 14 wherein upon a determination that said suspicion level counter exceeds said suspicion level threshold, said method further comprising taking protective action to protect a computer system.

16. The method of claim 14 wherein upon a determination that said suspicion level counter exceeds said suspicion level threshold, said method further comprising providing a notification.

17. The method of claim 14 further comprising stalling said action, wherein upon a determination that said suspicion level counter does not exceed said suspicion level threshold, said method further comprising releasing said action.

18. The method of claim 13 further comprising decrementing said suspicion level counter for said positive action.

19. The method of claim 13 further comprising hooking said application.

20. The method of claim 13 further comprising hooking said action.

21. A computer readable storage medium comprising instructions for a behavior blocking application, said behavior blocking application when executed determines that an action by an application is a negative action;
said behavior blocking application further for determining if said application has had a previous positive action prior to said negative action, wherein said positive action is use of a user interface element by said application to have a user interaction with a user,
wherein if a determination is made that said application has had said previous positive action prior to said negative action, said behavior blocking application further for setting an increment value of a suspicion level counter for said negative action to a first value,
wherein if a determination is made that said application has not had said previous positive action prior to said negative action, said behavior blocking application further for setting said increment value of said suspicion level counter for said negative action to a second value, wherein said first value is less than said second value; and
said behavior blocking application further for incrementing said suspicion level counter by said increment value.

* * * * *